United States Patent
Hochgesang et al.

(10) Patent No.: US 7,311,822 B2
(45) Date of Patent: Dec. 25, 2007

(54) AQUARIUM

(76) Inventors: Bradley Earl Hochgesang, 890 2nd Ave., Jasper, IN (US) 47546; Andrew Kent Hochgesang, 890 2nd Ave., Jasper, IN (US) 47546

( * ) Notice: Subject to any disclaimer, the term of this patent is extended or adjusted under 35 U.S.C. 154(b) by 234 days.

(21) Appl. No.: 10/988,649

(22) Filed: Nov. 15, 2004

(65) Prior Publication Data

US 2006/0102537 A1    May 18, 2006

(51) Int. Cl.
*A01K 63/04* (2006.01)
*A01K 63/00* (2006.01)

(52) U.S. Cl. .................... 210/167.21; 210/167.23; 119/248; 119/259

(58) Field of Classification Search ............. 210/169, 210/416.1, 416.2, 167.01, 167.21, 167.22, 210/167.23; 119/248, 257, 259
See application file for complete search history.

(56) References Cited

U.S. PATENT DOCUMENTS

| | | | | |
|---|---|---|---|---|
| 3,795,225 A * | 3/1974 | Ogui | ................. | 119/248 |
| 4,528,940 A * | 7/1985 | Litzburg | ................. | 119/248 |
| 4,817,561 A * | 4/1989 | Byrne et al. | ................. | 119/260 |
| 4,863,594 A * | 9/1989 | Pedretti | ................. | 210/169 |
| 5,438,959 A * | 8/1995 | Stone et al. | ................. | 119/248 |
| 6,276,302 B1 * | 8/2001 | Lee | ................. | 119/260 |
| 6,397,780 B1 * | 6/2002 | Youngstrom | ................. | 119/246 |
| 6,415,739 B1 * | 7/2002 | Orendorff et al. | ................. | 119/248 |
| 2005/0051107 A1 * | 3/2005 | Hsieh et al. | ................. | 119/257 |
| 2006/0163131 A1 * | 7/2006 | Kieselbach | ................. | 210/169 |
| 2007/0039557 A1 * | 2/2007 | Vaccari | ................. | 119/259 |

* cited by examiner

*Primary Examiner*—Fred G. Prince
(74) *Attorney, Agent, or Firm*—Kerri A. Hochgesang

(57) ABSTRACT

The present invention provides a compact design and provides an improved viewable area. In an exemplary embodiment, the present invention comprises a container having a height, a depth and a width. The container comprises a main cavity, a lower cavity, at least one side cavity and a filtration system. The lower cavity is located below the main cavity and a first plate separates the lower cavity from the main cavity and allows limited fluid communication between the lower cavity and main cavity. The volume of the lower cavity is substantially less than the volume of the main cavity. The side cavity is located adjacent to the main cavity and a second plate separates the side cavity from the main cavity and allows limited fluid communication between the side cavity and main cavity. The side cavity has a volume less than the main cavity and more than the lower cavity.

14 Claims, 2 Drawing Sheets

AQUARIUM

ROSS REFERENCE TO RELATED APPLICATIONS

This application is related to, and incorporates by reference, U.S. patent application having Ser. No. 10/988,648, and entitled "AQUARIUM FILTER" which is filed concurrently herewith and is assigned to the same assignee.

TECHNICAL FIELD

The present invention relates to aquariums and, more particularly to an improved aquarium that requires a minimal amount of water while maximizing the livable area of the aquarium.

BACKGROUND OF THE INVENTION

Aquariums are a popular way to raise aquatic animals and plants for pets, as well as for aesthetic purposes. Aquariums are also used for business, scientific and educational purposes. However, such an aquarium generally occupies large spaces since there should be provided a filter device therein as well as about 10 and 20 gallons of water. Some larger aquariums require substantially more water.

It is understood that aquarium water is changed to remove a build-up of chemicals, which the aquarium filter cannot remove. It is also commonly understood that frequent water change is expected due to secrets of aquatic animals and food waste which are known to pollute the water in the aquarium. To meet the need there have been introduced various filter devices to minimize the frequency of water change.

Further, because of deficiencies in current filtration design, it has therefore been necessary to maintain a large volume of water to act as a buffer in both fresh and salt water aquariums so to avoid poisoning of the aquatic animals. For example, each gold fish typically requires 1-10 gallons of water, depending on its size, to avoid poisoning and maintain water clarity, even when aquarium water is purified by typical filtration systems driven by a pump.

Therefore, aquarium enthusiasts have searched for the perfect aquarium system that will reduce aquatic pollutants efficiently to enable maximum use of the aquatic living area. Traditionally, an aquarium filer is employed for this purpose.

The most common aquarium filter is a power filter which hangs on the outside of the aquarium over the top edge thereof. It includes a siphon tube which carries water from the aquarium into the filter box which is located on the outside of the tank. Water entering the filter box flows over various types of filter media to remove particulate matter from the water. The water passes through filter carbon to remove chemicals impurities from the water which is then pumped back into the aquarium using a filter pump.

Another type of aquarium filter used is a canister type filter which is posited outside and, usually, below the aquarium. Intake and output hoses hang over the aquarium edge and are connected to the canister filter on the floor. Water is fed by gravity through the intake hose from the aquarium to the canister. The aquarium water is both mechanically and chemically treated and pumped back into the aquarium by a pump contained in the canister. Examples of canister type filters include the Hagen Fluval filter marketed by Hagen USA Mfg., Co.; and Marine Land canister filter marketed by Aquaria, Inc.

An internally mounted power filter is still another type of aquarium filter. Such filters comprise a small canister with a built-in pump which is submerged inside the aquarium. Water enters the bottom of the canister and flows through a filter sleeve which removes particulate and chemical waste. The filtered water is then pumped out the top of the canister and back into the aquarium. Examples of this type of filter are the Supreme Ovation internal filter marketed by Danner Mfg. and the Hagen Fluval internal filter sold by Hagen USA Mfg. Co.

Still another type of filter employed in aquariums is the undergravel filter which consists of a perforated raised plate which rests on the aquarium floor. Riser tubes are provided on either end of the filter and extend into the top of the aquarium. Gravel is placed on top of the plate to a thickness of about 2", or one pound per gallon. Air lines from an external pump are placed in the riser tubes to the bottom plate and an air stone is placed at the end of the air lines. Air is forced by the pump to the air stones thereby forcing air bubbles to travel up through the tubes to the water surface creating turbulence or current. Water is then pulled through the gravel and forced up the riser tubes. Waste from the aquarium is drawn through the gravel bed where bacteria break down any ammonia or nitrites to less harmful nitrates. A biological filter does not, however, remove all chemical wastes and by itself is considered a very inefficient form of filtration. Examples of such undergravel filters include filters marketed by Perfecto Mfg. and Penplex Mfg.

Yet another type of filter commonly used in aquariums is a wet/dry trickle type filter which includes a skimmer box that hangs inside the aquarium at the top. Siphon tubes are provided for carrying water from the aquarium to a pre-filter which is mounted directly behind the skimmer box on the outside of the aquarium. Water passes through foam sleeves in a pre-filter to trap particulate matter. The water then travels through the hose in a tank typically positioned beneath the aquarium. As water enters the tank beneath the aquarium, it flows onto a drip plate or spray bar in a dry chamber of filters which may contain biomedia. Water drips over and through the biomedia to the bottom section of the tank. Bacteria colonies grow on the biomedia which feed on waste products in the water passing over them. From there, the water gathers in the bottom of the filter tank and then passes through a carbon filter or other filter to remove chemical wastes from the water. If necessary, water is then passed through dolomite, crushed coral or crushed clam shells to buffer the water which is then pumped through the return hose back to the aquarium. Wet/dry filters can include mechanical, chemical and biological filters.

An alternative type of surface skimming filter is accomplished by drilling a hole through the bottom of a conventional aquarium and extending a tube to the surface of the water. This creates a surface skimming action. In this case, a hose could be connected to the tube and directed into an external wet/dry filter.

An alternative form of the wet/dry filter is an internally mounted wet/dry filtration system which includes an integrated pump and for small aquariums. The filter is placed inside the aquarium against a wall with the top of the filter at the water level. Water enters the filter and then passes through the filter cartridge which removes particulate and chemical waste materials. A portion of the water is then pumped into a drip plate in a dry chamber for biological filtration. The remaining water is then pumped directly back into the aquarium so as to bypass the dry area.

While some of the filters described above improve the water quality, they still do not allow a substantial decrease in the area of the aquarium. In fact, most of the filters are bulky and large, thus either increasing the size of the aquarium itself or increasing the size of the entire system. Further, the combination of a filter with hoses or boxes external to the aquarium is not efficient and, additionally, takes up substantial space. Moreover, most enthusiasts will agree that a large, aesthetically pleasing viewing area is the most important factor in purchasing an aquarium, however; with most filters being bulky and large, a smaller and less pleasing viewing area is the result.

What is needed, therefore, is an improved aquarium that will support aquatic animals in a minimal amount of water and, additionally, reduce the space required for other components to facilitate a compact design and provide an improved viewable area.

SUMMARY OF THE INVENTION

In general, the present invention can be described as an improved aquarium. More specifically, the present invention is an aquarium that requires a minimal amount of water and, additionally, reduces the space required for other components to facilitate a compact design and provide an improved viewable area.

In an exemplary embodiment, the present invention comprises a container having a height, a depth and a width. The container comprises a main cavity, a lower cavity, at least one side cavity and a filtration system. The lower cavity is located below the main cavity and a first plate separates the lower cavity from the main cavity. In an exemplary embodiment of the present invention, the volume of the lower cavity is substantially less than the volume of the main cavity. The first plate provides a barrier to fluid communication between the main cavity and the lower cavity along all but a small fraction of the length or depth, or both, of the container. The first plate further provides limited fluid communication between the main cavity and the lower cavity along a substantial part of the length of the container. In an exemplary embodiment of the present invention, the limited fluid communication between the main and lower cavities can be provided by a narrow gap between the first plate and a wall of the container, or by a plurality of holes located substantially along the length of the first plate. Throughout this application, a hole or holes, may be defined as an opening in a substrate that can take on any shape such that fluid can pass through. The side cavity is located adjacent to the main cavity and a second plate separates the side cavity from the main cavity. The second plate provides a barrier to fluid communication between the side cavity and the main cavity along all but a small fraction of the height of the container. The side plate further provides limited fluid communication between the side cavity and the lower cavity along a small fraction of the depth or height or both the depth and height of the container. In an exemplary embodiment of the present invention, the limited fluid communication between the main and side cavities can be provided by a narrow gap between the second plate and a wall of the container. In an alternative exemplary embodiment of the present invention, the limited fluid communication between the main and side cavities can be provided by a plurality of openings located substantially along the depth and a small portion of the height of the second plate.

In an exemplary embodiment of the present invention, the filtration system provides for purification of the water and at least a portion of the filtration system may be located in the side cavity of the container. The filtration system may have a vacuum pump and as many as four or more filters. One of the filters can have a mechanical filter for removing microorganisms and organic matters; another, activated charcoal for removing harmful chemicals and organic matters from the water; another, an ammonia removing substance for removing ammonia from the water; and another, biological filter for mixing air into the water and cultivating nitrifying bacteria in the water.

In operation, aquatic life lives in the main cavity of the container. When the filtration system is in operation, water flows from the main cavity, over the second plate like a spillway and cascades into the side cavity of the container. The action of the water cascading from the main cavity acts to skim debris and pollutants that have collected on the surface of the water and directs them into the side cavity where they can be filtered. The filtration system located in the side cavity filters the water mechanically, chemically, biologically, and removes ammonia from the water. The filtration system then directs the water into the lower cavity through the bottom of the second plate. The water is then forced through the plurality of holes in the first plate and into the main cavity. This action causes the sediment and other pollutants resting on the bottom of the container to be forced to the top of the container where they can be skimmed by the second plate over the spillway.

In another exemplary embodiment of the present invention, the container comprises a main cavity, a lower cavity, a first side cavity and a second side cavity. The second side cavity is located adjacent to the main cavity and opposite the first side cavity. A third plate separates the second side cavity from the main cavity. Like the second plate, the third plate provides a barrier to fluid communication between the second side cavity and the main cavity along all but a small fraction of the height of the container. The third plate operates as a second surface skimmer for the container. Water flows over the third plate and into the second side cavity.

In another exemplary embodiment of the present invention, a second filtration system with at least a portion of the filtration system may be located in the second side cavity of the container. The second filtration system acts to filter the water similar to the filtration system. In an exemplary embodiment of the present invention, the filtration system and the second filtration system may share the vacuum pump. In addition, the filtration system and second filtration system may direct the filtered water into the lower cavity and through the plurality of holes located in the first plate and into the main cavity.

In another exemplary embodiment of the present invention, a fourth plate may be located in said lower cavity to separate said lower cavity into a first lower cavity and a second lower cavity. The fourth plate provides a barrier to fluid communication between the first lower cavity and the second cavity along the length or depth, or both, of the container. The fourth plate further provides limited fluid communication between the first side cavity and the second side cavity along a portion of the length or depth, or both of the container. In an exemplary embodiment of the present invention, the limited fluid communication between the first side and second side cavities can be provided by a narrow gap between the fourth plate and a wall of the container. This limited fluid communication provided by said fourth plate allows equalization of liquid between said first and second side cavities.

In yet another exemplary embodiment of the present invention, the depth of the container may be about one inch or less. In an exemplary embodiment of the present invention, the height of the lower cavity extends along less than about (10) percent of the height of the container. In addition, the size of the side cavities may be about one inch or less, thus, minimizing the total size of the container and providing a large main cavity for maximum viewing of aquatic life.

The benefits according to the present invention are numerous, including: (1) an aquarium with a lower water volume than has been previously practical and that can be constructed and used without poisoning; (2) an aquarium that maximizes the size and configuration to successfully sustain larger quantities of aquatic animals than has been previously practical; (3) an aquarium of minimal size that can be mounted onto a wall or other flat surface; and numerous other benefits.

BRIEF DESCRIPTION OF THE DRAWINGS

Other aspects, advantages and novel features of the invention will become more apparent from the following detailed description of exemplary embodiments of the invention when considered in conjunction with the accompanying drawings wherein.

DETAILED DESCRIPTION

In general, the present invention can be described as a novel aquarium filter that requires a minimal amount of water and, additionally, reduces the space required for other components to facilitate a compact design and provide an improved viewable area.

Referring now to the figures, in which like numerals refer to like elements throughout the several views, exemplary embodiments of the present invention are described.

Figure 1:
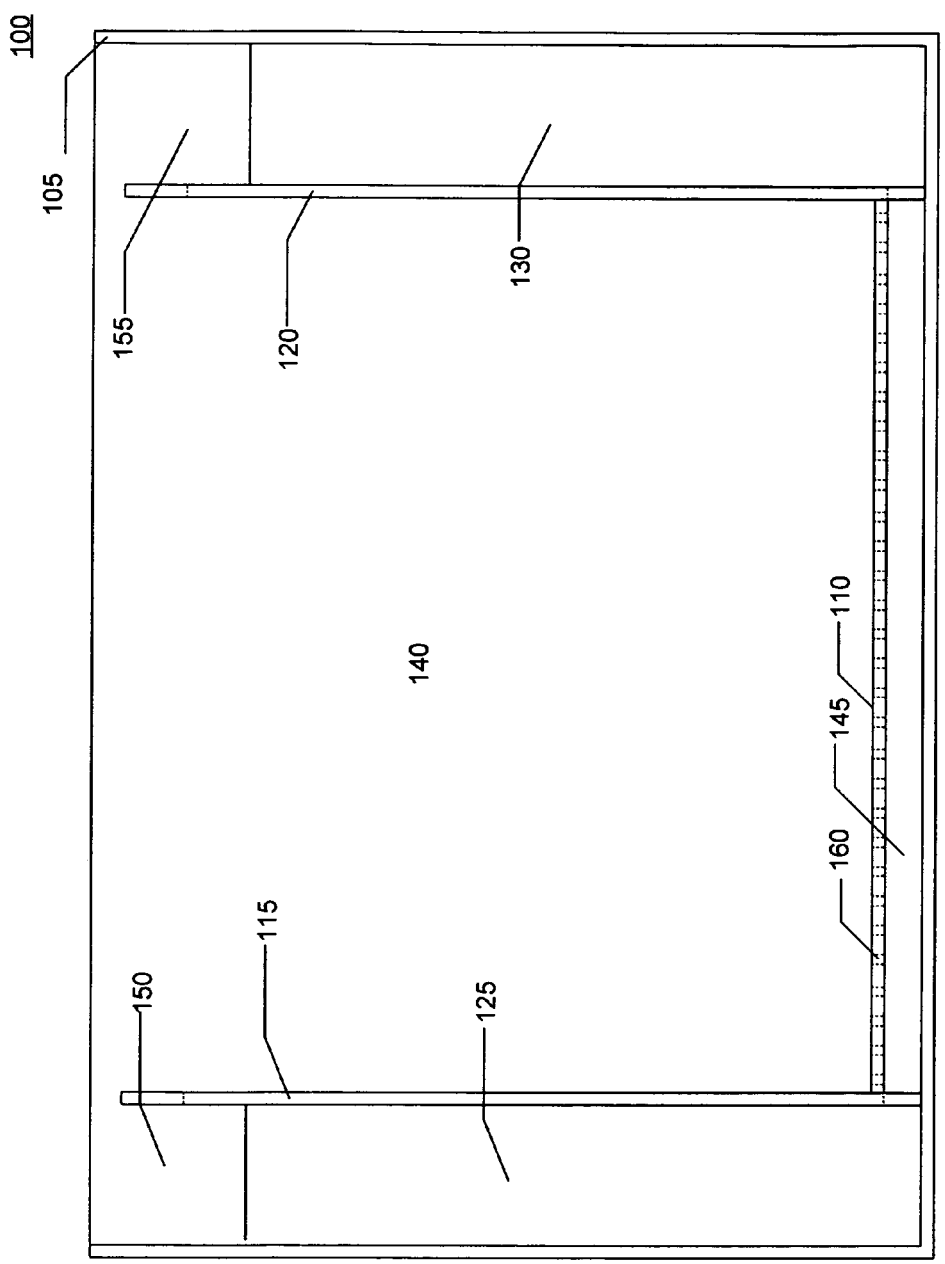
FIG. 1 is a schematic cross-sectional view illustrating an aquarium according to the present invention.
Figure 2:
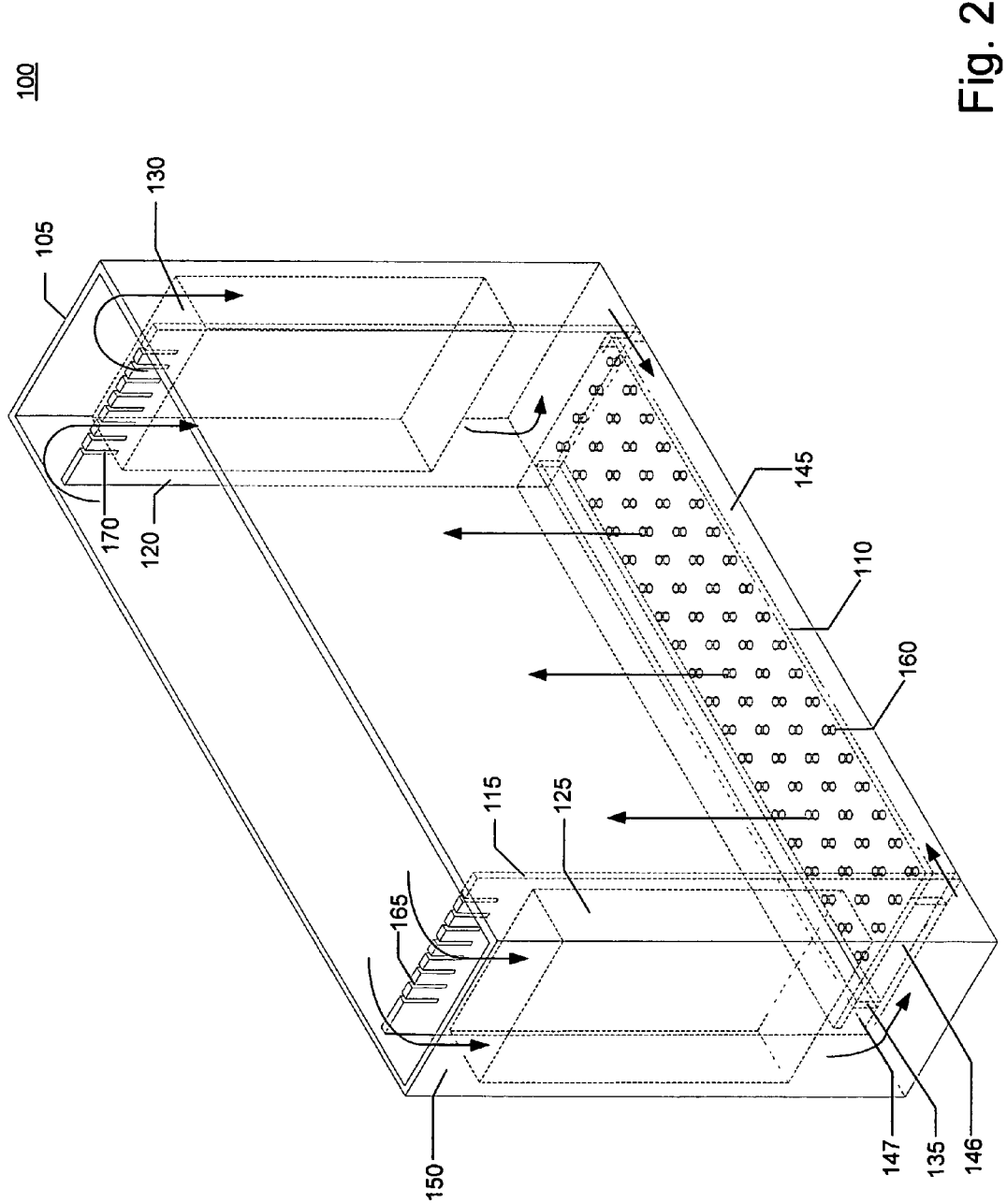
FIG. 2 is a perspective cross-sectional view illustrating water flow within the aquarium according to the present invention.

In conjunction with FIGS. 1 & 2, an exemplary embodiment of the present invention are depicted by an aquarium 100 comprising a container 105, a first plate 110, a second plate 115, a third plate 120, a filtration system 125 and a second filtration system 130. The first plate 110, second plate 115, third plate 120, filtration system 125 and second filtration system 130 are located within the container 105.

The container 105 has a height, a length and a depth and forms a main cavity 140, a lower cavity 145, a first side cavity 150 and a second side cavity 155. The container 105 has a depth of about 1 inch. The main cavity 140 is located inside the container 105 and may contain water and aquatic life. The main cavity 140 forms a first volume. The lower cavity 145 is located inside the container 105 and below the main cavity 140 and forms a second volume that is substantially less than the first volume. The lower cavity 145 extends along substantially the entire length and depth of the container 105. The lower cavity 145 extends along less than about 10 percent of the height. The first side cavity 150 is located inside the container 105 and adjacent to the main cavity 140. The first side cavity 150 has a third volume less than the first volume and greater than the second volume. The first side cavity 150 extends along substantially the entire height and depth of the container 105. The first side cavity 150 extends along less than about 3 inches of the width of said container 105. The second side cavity 155 is located inside the container 105 and adjacent to the main cavity 140. The second side cavity 155 has a fourth volume substantially equal to the third volume. The second side cavity 155 extends along substantially the entire height and depth of the container 105. The second side cavity 155 extends along less than about 3 inches of the width of said container 105.

The first plate 110 separates the main cavity 140 from the lower cavity 145. The first plate 110 provides a barrier against fluid communication between the main cavity 140 and the lower cavity 145 along all but a small fraction of the length and depth of the container 105. The first plate 110 also provides limited fluid communication between the main cavity 140 and the lower cavity 145 in locations extending along at least a substantial part of the length of said container 105. The first plate 110 includes a plurality of holes 160 for providing the fluid communication between the main cavity 140 and the lower cavity 145. The first plate 110 provides a narrow gap between said first plate 110 and a wall of said container for fluid communication between the first side cavity 150 and the lower cavity 145. The first plate 110 provides a narrow gap between the first plate 110 and a wall of said container for fluid communication between the second side cavity 155 and the lower cavity 145.

The second plate 115 separates the first side cavity 150 from the main cavity 140. The second plate 115 provides a barrier against fluid communication between the main cavity 140 and the first side cavity 150 along all but a small fraction of the height and depth of said container 105. The second plate 115 provides limited fluid communication between the main cavity 140 and the first side cavity 150. The second plate 115 provides a plurality of holes 165 for fluid communication between the main cavity 140 and first side cavity 150.

The third plate 120 separates the second side cavity 155 from the main cavity 140. The third plate 120 provides a barrier against fluid communication between the main cavity 140 and the second side cavity 155 along all but a small fraction of the height and depth of said container 105. The third plate 120 provides limited fluid communication between said main cavity 140 and the second side cavity 155. The third plate 120 provides a plurality of holes 170 for fluid communication between the main cavity 140 and the second side cavity 155.

The fourth plate 135 separates the lower cavity 145 into a first lower cavity 146 and a second lower cavity 147. The fourth plate 135 provides a barrier against fluid communication between said first lower cavity 146 and said second lower cavity 147. Said second lower cavity 147 provides fluid communication between said first side cavity 150 and said second side cavity 155 for equalization of said first 150 and second 155 side cavities.

The first filtration system 125 is in fluid communication with the main cavity 140 for intake of polluted water. The first filtration system 125 is also in fluid communication with the lower cavity 145 for outgo of purified water after the polluted water has been purified by the first filtration system 125.

The second filtration system 130 is in fluid communication with the main cavity 140 for intake of polluted water. The second filtration system 130 is also in fluid communication with the lower cavity 145 for outgo of purified water after the polluted water has been purified by the second filtration system 130.

One skilled in the art will appreciate that the application of the present invention can take many forms and functions and the examples provided herein are only used to illustrate a few of these possibilities. The scope of the present invention is not limited by these examples.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. An aquarium for providing water and living space to aquatic animals, the aquarium comprising:
   a) a container having a height, a length and a depth, the container comprising:
      (i) a main cavity located inside said container having a first volume;
      (ii) a lower cavity located inside said container and below said main cavity, said lower cavity having a second volume substantially less than said first volume; and
      (iii) a first side cavity located inside said container and adjacent to said main cavity, said side cavity having a third volume less than maid first volume and greater than said second volume; and
   b) a first plate separating said main cavity from said lower cavity, said first plate providing limited fluid communication between said main cavity and said lower cavity in locations extending along at least a substantial part or the length of said container;
   c) a second plate, said second plate providing a barrier against fluid communication between said main cavity and said side cavity along all but small fraction of the height and depth of said container and said second plate providing limited fluid communication between said main cavity and said side cavity;
   d) a filtration system in fluid communication with said main cavity for intake of polluted water, said filtration system also in fluid communication with said lower cavity for outgo of purified water after said polluted water has been purified by said filtration system; and
   e) a second side cavity located inside said container and adjacent to said main cavity, said second side cavity having a fourth volume substantially equal to said third volume.

2. The aquarium of claim 1, wherein said lower cavity extends along substantially the entire height and depth of said container.

3. The aquarium of claim 1, wherein said first side cavity extends along substantially the entire height and depth of said container.

4. The aquarium of claim 3, wherein said second plate provides a narrow gap between said second plate and a wall of said container for fluid communication between said main cavity and said first side cavity.

5. The aquarium of claim 1, wherein a third plate provides a barrier against fluid communication between said main cavity and said second side cavity along all but a small fraction of the height and depth of said container and said third plate provides limited fluid communication between said main cavity and said second side cavity.

6. The aquarium of claim 5, wherein said second side cavity extends along substantially the entire height and depth of said container.

7. The aquarium of claim 6, wherein said third plate provides a narrow gap between said third plate and a wall of said container for fluid communication between said main cavity and said second side cavity.

8. The aquarium of claim 7, wherein said first plate provides a narrow gap between said first plate and a wall of said container for fluid communication between said first side cavity and said lower cavity.

9. The aquarium of claim 8, wherein said first plate provides a narrow gap between said first plate and a wall of said container for fluid communication between said second side cavity and said lower cavity.

10. The aquarium of claim 9, wherein said second plate includes a plurality of holes that provides fluid communication between said main cavity and said side cavity.

11. The aquarium of claim 10, wherein said second side cavity extends along substantially the entire height and depth of said container.

12. An aquarium for providing water and living space to aquatic animals, the aquarium comprising:
    a) a container having a height, a length and a depth, the container comprising:
       (i) a main cavity located inside said container having a first volume;
       (ii) a lower cavity located inside said container and below said main cavity, said lower cavity having a second volume substantially less than said first volume;
       (iii) a first side cavity located inside said container and adjacent to said main cavity, said first side cavity having a third volume less than said first volume and greater than said second volume; and
       (iv) a second side cavity located inside said container and adjacent to said main cavity, said second side cavity having a fourth volume substantially equal to said third volume; and
    b) a first plate separating said main cavity from, said lower cavity, said first plate providing a barrier against fluid communication between said main cavity and said lower cavity along all but a small fraction of the length and depth of said container and said first plate providing limited fluid communication between said main cavity and said lower cavity in locations extending along at least a substantial part of the length of said container;
    c) a second plate, said second plate providing a barrier against fluid communication between said main cavity and said first side cavity along all but a small fraction of the height and depth of said container and said second plate providing limited fluid communication between said main cavity and said first side cavity;
    d) a third plate, said third plate providing a barrier against fluid communication between said main cavity and said second side cavity along all but a small fraction of the height and depth of said container and said third plate providing limited fluid communication between said main cavity and said second side cavity; and
    e) a filtration system in fluid communication with said main cavity for intake of polluted water, said filtration system also in fluid communication with said lower cavity for outgo of purified water after said polluted water has been purified by said filtration system.

13. The aquarium of claim 12, wherein said first plate includes a plurality of holes for providing the fluid communication between said main cavity and said lower cavity.

14. An aquarium for providing water and living space to aquatic animals, the aquarium comprising:
    a) a container having a height, a length and a depth, the container comprising:
       (i) a main cavity located inside said container having a first volume;
       (ii) a lower cavity located inside said container and below said main cavity, said lower cavity having a second volume substantially less than said first volume; said lower cavity extends along substantially the entire length and depth of said container;

(iii) a first side cavity located inside said container and adjacent to said main cavity, said first side cavity having a third volume less than said first volume and greater than said second volume; and (iv) a second side cavity located inside said container and adjacent to said main cavity, said second side cavity having a fourth volume substantially equal to said third volume; and b) a first plate separating said main cavity from said lower cavity, said first plate providing a barrier against fluid communication between said main cavity and said lower cavity along all but a small fraction of the length and depth of said container and said first plate providing limited fluid communication between said main cavity and said lower cavity in locations extending along at lean a substantial part of the length of said container, said first plate includes a plurality of holes for providing the fluid communication between said main cavity and said lower cavity:

c) a second plate, said second plate providing a barrier against fluid communication between said main cavity and said first side cavity along all but a small fraction of the height and depth of said container and said second plate, providing limited fluid communication between said main cavity and said first side cavity, said second plate includes a plurality of holes that provides fluid communication between said main cavity and said side cavity;

d) a third plate, said third plate providing a barrier against fluid communication between said main cavity and said second side cavity along all but a small fraction of the height and depth of said container and said third plate providing limited fluid communication between said main cavity and said second side cavity, said third plate procides a narrow gap between said third plate and a wall of said container for fluid communication betwen said main cavity and said side cavity; and e) a filtration system in fluid communication with said main cavity for intake of polluted water, said filtration system also in fluid communication with said lower cavity for outgo of purified water after said polluted water has been purified by said filtration system.

* * * * *